(12) United States Patent
Ishikawa et al.

(10) Patent No.: US 8,492,485 B2
(45) Date of Patent: Jul. 23, 2013

(54) POLYCARBONATE RESIN COMPOSITION FOR SLIDING USE AND MOLDED ARTICLE USING THE RESIN COMPOSITION

(75) Inventors: Yasuhiro Ishikawa, Chiba (JP); Eiji Tamura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/057,566

(22) PCT Filed: Jul. 6, 2009

(86) PCT No.: PCT/JP2009/062301
§ 371 (c)(1),
(2), (4) Date: May 27, 2011

(87) PCT Pub. No.: WO2010/016348
PCT Pub. Date: Feb. 11, 2010

(65) Prior Publication Data
US 2012/0108739 A1    May 3, 2012

(30) Foreign Application Priority Data

Aug. 7, 2008  (JP) ................................ 2008-204621

(51) Int. Cl.
*C08F 283/02*    (2006.01)
*C08F 283/12*    (2006.01)

(52) U.S. Cl.
USPC ........... 525/464; 524/128; 524/287; 524/317; 524/334; 524/588; 524/611; 525/25; 525/28; 525/196; 525/219

(58) Field of Classification Search
None
See application file for complete search history.

(56) References Cited

U.S. PATENT DOCUMENTS

| | | | |
|---|---|---|---|
| 4,066,611 A * | 1/1978 | Axelrod | 524/114 |
| 5,488,086 A * | 1/1996 | Umeda et al. | 525/92 A |
| 5,502,134 A * | 3/1996 | Okamoto et al. | 524/537 |
| 5,916,980 A | 6/1999 | Ogawa et al. | |
| 7,879,967 B2 * | 2/2011 | Ebert et al. | 528/26 |
| 8,207,288 B2 * | 6/2012 | Hikosaka | 528/196 |
| 2006/0111501 A1 | 5/2006 | Cont et al. | |
| 2006/0159926 A1 * | 7/2006 | Funaki et al. | 428/412 |

FOREIGN PATENT DOCUMENTS

| | | |
|---|---|---|
| CN | 1123291 A | 5/1996 |
| JP | 6 313087 | 11/1994 |
| JP | 7-173276 A | 7/1995 |
| JP | 7-207140 A | 8/1995 |
| JP | 10 158499 | 6/1998 |
| JP | 2006 227177 | 8/2006 |
| JP | 2008 520807 | 6/2008 |
| WO | WO 2007/149651 A1 | 12/2007 |
| WO | WO 2008/136521 A1 * | 11/2008 |

OTHER PUBLICATIONS

Chinese Office Action issued May 3, 2012 in patent application No. 200980131628.2.
International Search Report Issued Oct. 6, 2009 in PCT/JP09/062301 filed Jul. 6, 2009.
U.S. Appl. No. 13/512,805, filed Jul. 23, 2012, Ishikawa.
Extended European Search Report issued Sep. 20, 2012 in European Patent Application Ao. 09804835.8.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

Provided is a polycarbonate-based resin composition for sliding use including 0.01 to 1 part by mass of an antioxidant with respect to 100 parts by mass of a polycarbonate-polyorganosiloxane copolymer which has structural units represented by a general formula (A) and structural units represented by a general formula (B), which contains a polyorganosiloxane block moiety containing the structural units represented by the general formula (B) at a content of 1 to 30 mass %, and which has an average repetition number of the structural units represented by the general formula (B) of 110 to 1000. The polycarbonate-based resin composition for sliding use has a specific structure having improved wear resistance, in particular, improved sliding property. Also provided is a molded article using the resin composition, and excellent in wear resistance and sliding property.

8 Claims, No Drawings

POLYCARBONATE RESIN COMPOSITION FOR SLIDING USE AND MOLDED ARTICLE USING THE RESIN COMPOSITION

TECHNICAL FIELD

The present invention relates to a polycarbonate-based resin composition for sliding use, which has improved wear resistance, in particular, improved sliding property, and more specifically, to a resin composition for sliding use, which contains a polycarbonate-polyorganosiloxane copolymer having a specific structure, and a molded article using the resin composition and having excellent wear resistance and sliding property.

BACKGROUND ART

Polycarbonate resins produced from bisphenol A and the like have been finding use in materials for various parts in, for example, an electrical and electronic field and an automobile field because the resins are excellent in thermal resistance and mechanical properties. However, sliding properties may be requested of the resins depending on places where the resins are used. In addition, a polycarbonate resin formed of bisphenol A is poor in sliding property when being used alone. Accordingly, the addition of a sliding property improver has been attempted. For example, a resin composition with polytetrafluoroethylene (PTFE) (see Patent Document 1), a resin composition with a silicone oil (see Patent Document 2), a resin composition with a polyolefin wax or the like (see Patent Document 3), and a resin composition with a polyphenylene resin (see Patent Document 4) have been known as polycarbonate resin compositions for sliding use.

When a sliding property material is added in a small amount to any one of those resin compositions, an improving effect on the sliding property of the resin composition is insufficient. However, increasing the addition amount involves the emergence of the following problem. That is, mechanical properties such as tensile property inherent in a polycarbonate resin reduce, or the sliding property reduces owing to wear or dropping upon long-term use.

Meanwhile, a polycarbonate-polydimethylsiloxane copolymer (PC-PDMS) has been known as a polycarbonate excellent in impact resistance and flame retardancy (see Patent Document 5).

However, only a small number of reports have been made on the sliding property of the PC-PDMS itself and the sliding property has not been satisfactory (see Patent Documents 6 to 9). Accordingly, in actuality, it has been necessary to blend PTFE as a sliding property improver into the PC-PDMS to prepare a resin composition (see Patent Document 10).

It has been recently reported that a polycarbonate resin obtained by the polycondensation of an acryl-denatured polyorganosiloxane having a hydroxyl group, a diol compound, and a carbonic acid derivative has improved sliding property and is suitable for an electrophotographic photosensitive member. However, only the molecular weight of the produced acryl-denatured polyorganosiloxane-copolymerized polycarbonate has been described, and no information about the copolymerization amount and siloxane chain length of the polycarbonate has been given (see Patent Document 11).

It has been reported that a copolymer having a terminal denatured with polyorganosiloxane is excellent in sliding property after a weatherability test (see Patent Document 12) and has a reducing effect on a coefficient of dynamic friction (see Patent Document 13).

That is, it has been necessary to improve the sliding property in any polycarbonate resin.
Patent Document 1: JP 7-228763 A
Patent Document 2: JP 36-7641 B
Patent Document 3: JP 2005-320367 A
Patent Document 4: JP 2007-23094 A
Patent Document 5: JP 2663210 B2
Patent Document 6: JP 05-202181 A
Patent Document 7: JP 05-202182 A
Patent Document 8: JP 05-200761 A
Patent Document 9: JP 05-200827 A
Patent Document 10: JP 04-225061 A
Patent Document 11: JP 2006-16566 A
Patent Document 12: JP 2002-284871 A
Patent Document 13: JP 2008-102196 A

DISCLOSURE OF THE INVENTION

Problems to be Solved by the Invention

The present invention has been made to solve the problems of the prior art described above, and an object of the present invention is to provide a polycarbonate-based resin composition for sliding use having a specific structure having improved wear resistance, in particular, improved sliding property, and a molded article using the resin composition, and excellent in wear resistance and sliding property.

Means for Solving the Problems

The inventors of the present invention have made extensive studies to achieve the above-mentioned object. As a result, the inventors have found that the object can be achieved by blending a polycarbonate-polyorganosiloxane copolymer having a specific structure with a specific amount of an antioxidant. The present invention has been completed on the basis of such finding.

That is, the present invention provides:

[1] a polycarbonate-based resin composition for sliding use including 0.01 to 1 part by mass of an antioxidant with respect to 100 parts by mass of a polycarbonate-polyorganosiloxane copolymer which has structural units represented by a general formula (A) and structural units represented by a general formula (B), which contains a polyorganosiloxane block moiety containing the structural units represented by the general formula (B) at a content of 1 to 30 mass %, and which has an average repetition number of the structural units represented by the general formula (B) of 110 to 1000:

[Chem. 1]

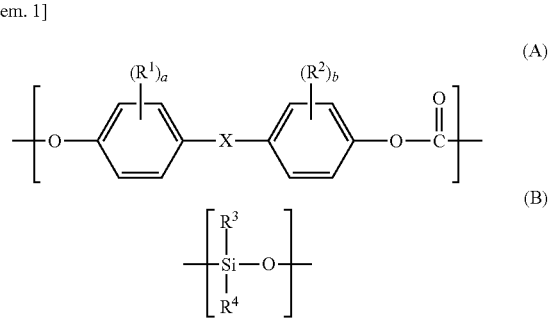

where $R^1$ and $R^2$ each independently represent an alkyl or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, $R^3$ and $R^4$ each independently represent a hydrogen atom, a halogen atom, or an alkyl or aryl group which may have a substituent, and a and b each represent an integer of 0 to 4;

[2] the polycarbonate-based resin composition for sliding use according to the above item [1], in which the polycarbonate-polyorganosiloxane copolymer has a viscosity average molecular weight of 13,000 to 50,000;

[3] the polycarbonate-based resin composition for sliding use according to the above item [1] or [2], further including 2 to 98 parts by mass of an aromatic polycarbonate with respect to 100 parts by mass of the polycarbonate-polyorganosiloxane copolymer; and

[4] a molded article including the polycarbonate-based resin composition for sliding use according to any one of the above items [1] to [3].

Effects of the Invention

According to the present invention, there can be provided a polycarbonate-based resin composition for sliding use excellent in sliding property and having improved wear resistance, and a molded article using the composition and having the above-mentioned properties.

BEST MODE FOR CARRYING OUT THE INVENTION

A polycarbonate-based resin composition for sliding use of the present invention can have improved sliding property and improved wear resistance by being a composition containing 0.01 to 1 part by mass, preferably 0.01 to 0.5 part by mass, of an antioxidant with respect to 100 parts by mass of a polycarbonate-polyorganosiloxane copolymer which has structural units represented by a general formula (A) and structural units represented by a general formula (B), which contains a polyorganosiloxane block moiety containing the structural units represented by the general formula (B) at a content of 1 to 30 mass %, preferably 1 to 20 mass %, and which has an average repetition number of the structural units represented by the general formula (B) of 110 to 1000, preferably 160 to 1000, more preferably 200 to 700.

[Chem. 2]

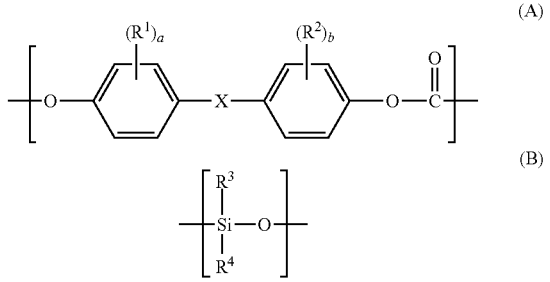

[In the formula, $R^1$ and $R^2$ each independently represent an alkyl or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, $R^3$ and $R^4$ each independently represent a hydrogen atom, a halogen atom, or an alkyl or aryl group which may have a substituent, and a and b each represent an integer of 0 to 4.]

When the content of the polyorganosiloxane block moiety containing the structural units represented by the general formula (B) is less than 1 mass %, the sliding property is not sufficient. When the content exceeds 30 mass %, a reduction in thermal resistance becomes remarkable.

[Polycarbonate-Polyorganosiloxane Copolymer]

Hereinafter, the polycarbonate-polyorganosiloxane copolymer (which may hereinafter be referred to as "polycarbonate-based resin") is described.

The polycarbonate-based resin used in the present invention is obtained by copolymerizing a dihydric phenol represented by the following general formula (1), a polyorganosiloxane represented by the following general formula (2), and phosgene, a carbonate, or a chloroformate, and is a polycarbonate-polyorganosiloxane copolymer containing the polyorganosiloxane block moiety containing the structural units represented by the general formula (B) at a ratio of 1 to 30 mass %.

[Chem. 3]

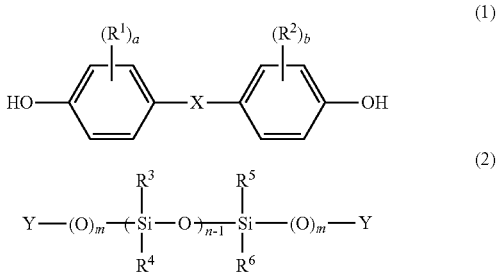

(In the general formula (1), X, $R^1$ and $R^2$, and a and b each have the same meaning as that in the general formula (A), and n corresponds to the average repetition number of the organosiloxane structural units and represents an integer of 110 to 1000. In the general formula (2), $R^3$, $R^4$, $R^5$, and $R^6$ each independently represent a hydrogen atom, a halogen atom, or an alkyl or aryl group which may have a substituent, Y represents a halogen, —$R^7$OH, —$R^7$COOH, —$R^7$NH$_2$, or —SH, $R^7$ represents a linear, branched, or cyclic alkylidene group, an aryl-substituted alkylidene group, or an aryl group, and m represents 0 or 1.)

Further, in the polycarbonate-based resin composition for sliding use of the present invention, various kinds of phenols are cited as the dihydric phenol represented by the general formula (1) used as a raw material of the polycarbonate-organopolysiloxane copolymer. In particular, 2,2-bis(4-hydroxyphenyl)propane [commonly called bisphenol A] is suitable. Examples of bisphenol other than bisphenol A include bis(hydroxyaryl)alkanes such as: bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(4-hydroxyphenyl)phenylmethane; 2,2-bis(4-hydroxy-3-methylphenyl)propane; bis(4-hydroxyphenyl)naphthylmethane; 1,1-bis(4-hydroxy-t-butylphenyl)propane; 2,2-bis(4-hydroxy-3-bromophenyl)propane; 2,2-bis(4-hydroxy-3,5-tetramethylphenyl)propane; 2,2-bis(4-hydroxy-3-chlorophenyl)propane; 2,2-bis(4-hydroxy-3,5-tetrachlorophenyl)propane; and 2,2-bis(4-hydroxy-3,5-tetrabromophenyl)propane, bis(hydroxyaryl)cycloalkanes such as: 1,1-bis(4-hydroxyphenyl)cyclopentane; 1,1-bis(4-hydroxyphenyl)cyclohexane; 1,1-bis(4-hydroxyphenyl)-3,5,5-trimethylcyclohexane; and 2,2'-bis(4-hydroxyphenyl)norbornene, dihydroxyaryl ethers such as: 4,4'-dihydroxyphenyl ether; and 4,4'-dihydroxy-3,3'-dimethylphenyl ether, dihydroxydiarylsulfides such as: 4,4'-dihydroxydiphenylsulfide; and 4,4'-dihydroxy-3,3'-dimethyldiphenylsulfide, dihydroxydiarylsulfoxides such as: 4,4'-dihydroxydiphenylsulfoxide; and 4,4'-dihydroxy-3,3'-dimethyldiphenylsulfoxide, dihydroxydiarylsulfones such as: 4,4'-dihydroxydiphenylsulfone; and 4,4'-dihydroxy-3,3'-dimethyldiphenylsulfone, dihydroxydiphenyls such as: 4,4'-dihydroxydiphenyl, dihydroxydiarylfluorenes such as: 9,9-bis(4-hydroxyphenyl)fluorene; and 9,9-bis(4-hydroxy-3-methylphenyl)fluorene, bis(4-hydroxyphenyl)diphenylmethane, dihydroxydiaryladamantanes such as: 1,3-bis(4-hydroxyphenyl)adamantane; 2,2-bis(4-hydroxyphenyl)adamantane; and 1,3-bis(4-hydroxyphenyl)-5,7-dimethyladamantane, bis(4-hydroxyphenyl)diphenylmethane, 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentaene. These dihydric phenols may each be used alone or as a mixture of two or more kinds.

Examples of the polyorganosiloxane represented by the general formula (2) include the following compounds. Of those, a phenol-denatured polyorganosiloxane represented by a formula (3) is preferred in terms of ease of polymerization, and furthermore, α,ω-bis[3-(o-hydroxyphenyl)propyl]polydimethylsiloxane as one kind of the compounds represented by a formula (4) or α,ω-bis[3-(4-hydroxy-3-methoxyphenyl)propyl]polydimethylsiloxane as one kind of the compounds represented by a formula (5) is preferred in terms of ease of availability.

[In the general formulae (3) to (11), $R^3$, $R^4$, $R^5$, and $R^6$ each independently represent a hydrogen atom, a halogen atom, or an alkyl or aryl group which may have a substituent as in the case of the general formula (1), $R^8$ represents an alkyl, alkenyl, aryl, or aralkyl group, n corresponds to the average repetition number of the organosiloxane structural units and represents an integer of 110 to 1000, and c represents a positive integer.]

The polyorganosiloxane represented by the general formula (2) is easily produced by performing a hydrosilanation reaction between any one of the phenols each having an olefinic, unsaturated carbon-carbon bond, suitably, for example, vinylphenol, allyl phenol, eugenol, or isopropenyl phenol and a terminal of a polyorganosiloxane chain having a predetermined polymerization degree n.

<Viscosity Average Molecular Weight>

The polycarbonate-polyorganosiloxane copolymer has a viscosity average molecular weight of 13,000 to 50,000, preferably 15,000 to 30,000, more preferably 15,000 to 26,000. When the viscosity average molecular weight is smaller than 13,000, the strength of a molded article is not sufficient. When the viscosity average molecular weight exceeds 50,000, productivity tends to reduce.

<Antioxidant>

In addition, in the polycarbonate-based resin composition for sliding use of the present invention, the antioxidant is blended as an essential component in an amount of 0.01 to 1 part by mass, preferably 0.01 to 0.5 part by mass with respect to 100 parts by mass of the polycarbonate-polyorganosiloxane copolymer.

In the polycarbonate-based resin composition for sliding use of the present invention, preferred examples of the antioxidant include hindered phenol-based antioxidants, aromatic amine-based antioxidants, hindered amine-based anti-

[Chem. 4]

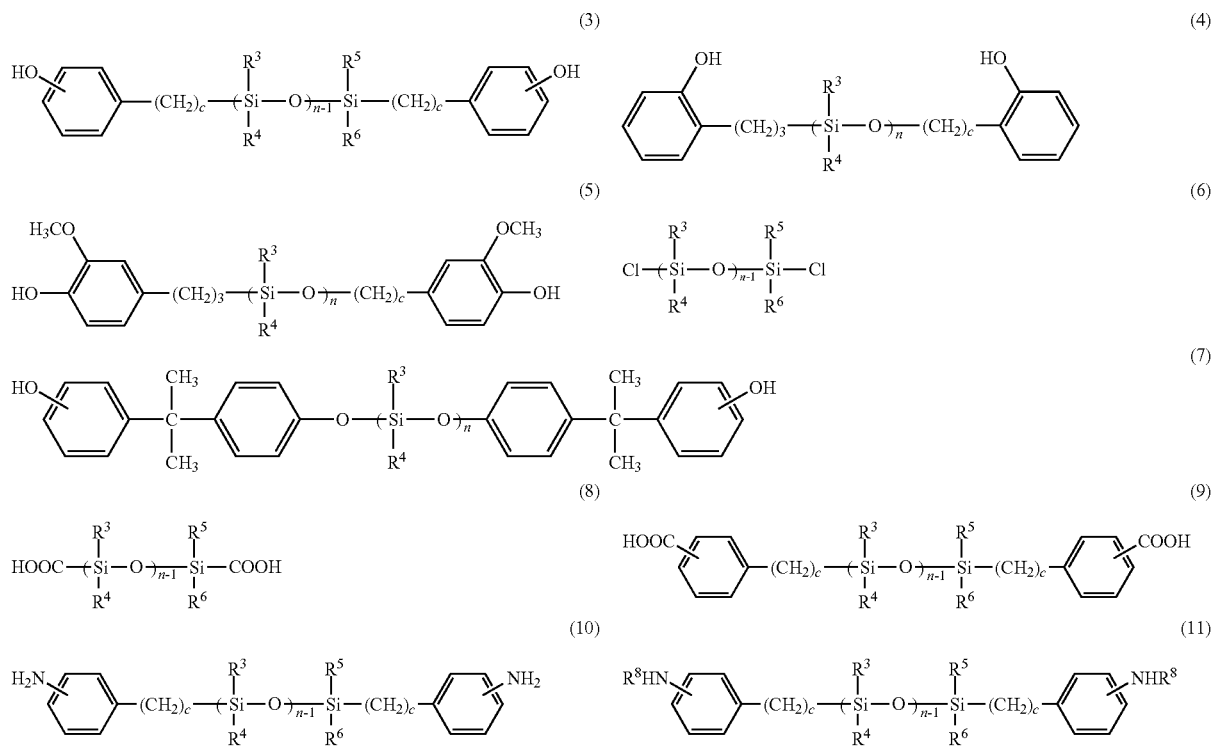

oxidants, sulfide-based antioxidants, and organophosphorus antioxidants. Of those, hindered phenol-based antioxidants and organophosphorus antioxidants are particularly preferred.

Examples of the antioxidant include: organophosphorus compounds such as triphenylphosphite, tris(4-methylphenyl)phosphite, tris(4-t-butylphenyl)phosphite, tris(mononylphenyl)phosphite, tris(2-methyl-4-ethylphenyl)phosphite, tris(2-methyl-4-t-butylphenyl)phosphite, tris(2,4-di-t-butylphenyl)phosphite, tris(2,6-di-t-butylphenyl)phosphite, tris(2,4-di-t-butyl-5-methylphenyl)phosphite, tris(mono, dinonylphenyl)phosphite, bis(mononylphenyl)pentaerythritol-di-phosphite, bis(2,4-di-t-butylphenyl)pentaerythritol-di-phosphite, bis(2,6-di-t-butyl-4-methylphenyl)pentaerythritol-di-phosphite, bis(2,4,6-tri-t-butylphenyl)pentaerythritol-di-phosphite, bis(2,4-di-t-butyl-5-methylphenyl)pentaerythritol-di-phosphite, 2,2-methylenebis(4,6-dimethylphenyl)octylphosphite, 2,2-methylenebis(4-t-butyl-6-methylphenyl)octylphosphite, 2,2-methylenebis(4,6-di-t-butylphenyl)octylphosphite, 2,2-methylenebis(4,6-dimethylphenyl)hexylphosphite, 2,2-methylenebis(4,6-di-t-butylphenyl)hexylphosphite, and 2,2-methylenebis(4,6-di-t-butylphenyl)stearylphosphite; hindered phenol-based compounds such as pentaerythritol-tetrakis[3-(3,5-di-t-butyl-4-hydroxyphenyl)propionate], 1,6-hexanediol-bis[3-(3,5-di-t-butyl-4-hydroxyphenyl)propionate], octadecyl-3-(3,5-di-t-butyl-4-hydroxyphenyl) propionate, 1,3,5-trimethyl-2,4,6-tris(3,5-di-t-butyl-4-hydroxybenzyl)benzene, triethylene glycol-bis[3-(3-t-butyl-5-methyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5,5]undecane, and 1,1,3-tris[2-methyl-4-(3,5-di-t-butyl-4-hydroxyphenylpropionyl oxy)-5-t-butylphenyl]butane.

One kind of them may be used alone, or two or more kinds of them may be used in combination. A combined use of one or more kinds of the organophosphorus compounds and one or more kinds of the hindered phenol-based compounds is particularly effective.

Those antioxidants are commercially available and preferred examples of the organophosphorus antioxidants to be used include tris(2,4-di-t-butylphenyl)phosphite under the trade name "IRGAFOS 168" (manufactured by Ciba Specialty Chemicals) and bis(2,6-di-t-butyl-4-methylphenyl) pentaerythritol-diphosphite under the trade name "ADK STAB PEP 36" (manufactured by Asahi Denka Kogyo K.K.).

Further, preferred examples of the hindered phenol-based antioxidant to be used include "IRGANOX 1076" (Trade Name, manufactured by Ciba Specialty Chemicals) and "IRGANOX 1010" (Trade Name, manufactured by Ciba Specialty Chemicals), and "Sumilizer GM" (Trade Name, manufactured by Sumitomo Chemical Co., Ltd.). Further, blended products of IRGANOX 1076 with IRGAFOS 168, and IRGANOX 1010 with IRGAFOS 168 are also commercially available.

<Aromatic Polycarbonate>

In the polycarbonate-based resin composition for sliding use of the present invention, an aromatic polycarbonate can be blended in an amount of 2 to 98 parts by mass with respect to 100 parts by mass of the polycarbonate-polyorganosiloxane copolymer for the purpose of adjusting the amount of the polyorganosiloxane block moiety.

A product obtained by a conventional production method for an aromatic polycarbonate such as an interfacial polymerization method or a pyridine method is used as the aromatic polycarbonate that can be used in the present invention. The interfacial polymerization method involves: causing a dihydric phenol-based compound and phosgene to react with each other in the presence of an organic solvent inert to the reaction and an alkali aqueous solution; and adding a polymerization catalyst such as a tertiary amine or a quaternary ammonium salt after the reaction to perform polymerization. The pyridine method involves: dissolving the dihydric phenol-based compound in pyridine or a mixed solution of pyridine and the inert solvent; and introducing phosgene to produce the product directly. A terminal terminator, a molecular weight modifier, a branching agent, or the like is used at the time of the above-mentioned reaction as required.

Examples of the dihydric phenol-based compound used in the production of the aromatic polycarbonate of the present invention include bis(hydroxyaryl)alkanes such as: 2,2-bis(4-hydroxyphenyl)propane (=bisphenol A), bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(4-hydroxyphenyl)phenylmethane; 2,2-bis(4-hydroxy-3-methylphenyl)propane; bis(4-hydroxyphenyl)naphthylmethane; 1,1-bis(4-hydroxy-t-butylphenyl) propane; 2,2-bis(4-hydroxy-3-bromophenyl)propane; 2,2-bis(4-hydroxy-3,5-tetramethylphenyl)propane; 2,2-bis(4-hydroxy-3-chlorophenyl)propane; 2,2-bis(4-hydroxy-3,5-tetrachlorophenyl)propane; and 2,2-bis(4-hydroxy-3,5-tetrabromophenyl)propane, bis(hydroxyaryl)cycloalkanes such as: 1,1-bis(4-hydroxyphenyl)cyclopentane; 1,1-bis(4-hydroxyphenyl)cyclohexane; 1,1-bis(4-hydroxyphenyl)-3,5,5-trimethylcyclohexane; and 2,2'-bis(4-hydroxyphenyl)norbornene, dihydroxyaryl ethers such as: 4,4'-dihydroxyphenyl ether; and 4,4'-dihydroxy-3,3'-dimethylphenyl ether, dihydroxydiarylsulfides such as: 4,4'-dihydroxydiphenylsulfide; and 4,4'-dihydroxy-3,3'-dimethyldiphenylsulfide, dihydroxydiarylsulfoxides such as: 4,4'-dihydroxydiphenylsulfoxide; and 4,4'-dihydroxy-3,3'-dimethyldiphenylsulfoxide, dihydroxydiarylsulfones such as: 4,4'-dihydroxydiphenylsulfone; and 4,4'-dihydroxy-3,3'-dimethyldiphenylsulfone, dihydroxydiphenyls such as: 4,4'-dihydroxydiphenyl, dihydroxydiarylfluorenes such as: 9,9-bis(4-hydroxyphenyl)fluorene; and 9,9-bis(4-hydroxy-3-methylphenyl)fluorene, bis(4-hydroxyphenyl)diphenylmethane, dihydroxydiaryladamantanes such as: 1,3-bis(4-hydroxyphenyl)adamantane; 2,2-bis(4-hydroxyphenyl)adamantane; and 1,3-bis(4-hydroxyphenyl)-5,7-dimethyladamantane, bis(4-hydroxyphenyl)diphenylmethane, 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentaene. These dihydric phenols may each be used alone or as a mixture of two or more kinds.

A terminal terminator or a molecular weight modifier is typically used upon production of the aromatic polycarbonate. Any one of the various modifiers typically used in the polymerization of PC resins can be used as the molecular weight modifier. To be more specific, examples of monohydric phenols include: phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkyl phenols each having a linear or branched alkyl group with an average carbon atom number of 12 to 35 at an ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol. Of those monohydric phenols, p-t-butylphenol, p-cumylphenol, p-phenylphenol, or the like is preferably used. As a matter of course, two or more kinds of the compounds may be used in combination. Further, a branching agent may be used in combination in the range of 0.01 to 3 mol %, particularly 0.1 to 1.0 mol %, with respect to the amount of the above-mentioned dihydric phenol-based compounds to prepare a branched polycarbonate. Examples of the branching agent include compounds each having 3 or more functional groups such as 1,1,1-tris(4-hydroxyphenyl) ethane; 4,4'-[1-[4-[1-(4-hydroxyphenyl)-1-methylethyl]phenyl]ethylidene]bisphenol, α,α', α'-tris(4-hydroxyphenyl)-1,3,5-triisopropylbenzene, 1-[α-methyl-α-(4'-hydroxyphenyl) ethyl]-4-[α',α'-bis(4"-hydroxyphenyl)ethyl]benzene, phloroglycine, trimellitic acid, and isatinbis(o-cresol).

The aromatic polycarbonate used in the present invention can be blended with anyone of the various additives conventionally known to polycarbonate resins as desired. Examples of those additives include a reinforcing material, a filler, a stabilizer, a UV absorber, an antistatic agent, a lubricant, a release agent, a dye, a pigment, any other flame retardant, and an elastomer for improving impact resistance.

In addition, an injection-molded article in the present invention is molded by general injection molding.

EXAMPLES

Next, the present invention is described in more detail by way of examples. However, the present invention is by no means limited by these examples.

Performance evaluation was performed by the following method in each of the following examples and comparative examples.
(1) Sliding Property Evaluation
Sliding property evaluation was performed with a thrust type tester in conformity with JIS K7218 A method (Ring on Ring). Tester name: Frictional wear tester (manufactured by Takachiho Seiki Co., Ltd.)
(1)-1: Measurements of Coefficient of Dynamic Friction and Wear Loss
Counterpart material: SUS304
Velocity V=0.5 m/S
Load P=50 N
Sliding distance L=3 km
Normal temperature
No lubrication
(1)-2: Measurement of Critical PV Value
Counterpart material: Common material
Load P: 5 to 50 N, the load P was increased at 5 N/10-minute step.
Velocity V=0.3 m/s (constant)
The load P at which a wear depth and a coefficient of friction abruptly changed was measured, and then a critical PV value was calculated.
<Polycarbonate Production Examples>
Oligomer Synthesis Step
Sodium dithionite was added to a 5.6-mass % aqueous solution of sodium hydroxide at a concentration of 2000 ppm with respect to bisphenol A (BPA) to be dissolved later in the solution. Then, BPA was dissolved in the resultant so that a BPA concentration was 13.5 mass %. Thus, an aqueous solution of sodium hydroxide containing BPA was prepared. The aqueous solution of sodium hydroxide containing BPA, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion, and the temperature of a reaction liquid was kept at 40° C. or less by passing cooling water through the jacket. The reaction liquid ejected from the tubular reactor was continuously introduced into a tank type reactor with a baffle having a swept-back blade and an internal volume of 40 L. Further, the aqueous solution of sodium hydroxide containing BPA, a 25-mass % aqueous solution of sodium hydroxide, water, and a 1-mass % aqueous solution of triethylamine were added to the liquid at 2.8 L/hr, 0.07 L/hr, 17 L/hr, and 0.64 L/hr, respectively so that a reaction was performed. The reaction liquid flooding out of the tank type reactor was continuously extracted, and was then left at rest so that an aqueous phase was separated and removed. Next, a methylene chloride phase was collected.

A polycarbonate oligomer thus obtained was present at a concentration of 329 g/L, and had a chloroformate group concentration of 0.74 mol/L.

Example 1

First, 15 L of the polycarbonate oligomer solution produced in the foregoing, 9.0 L of methylene chloride, 141 g of an allyl phenol terminal-denatured polydimethylsilane (PDMS) having a repetition number of dimethylsiloxane units of 300, and 8.8 mL of triethylamine were loaded into a 50-L tank type reactor provided with a baffle board, a paddle type stirring blade, and a cooling jacket. While the mixture was stirred, 1389 g of a 6.4-mass % aqueous solution of sodium hydroxide were added to the mixture so that a reaction between the polycarbonate oligomer and the allyl phenol terminal-denatured PDMS was performed for 10 minutes.

A solution of p-t-butylphenol (PTBP) in methylene chloride (solution prepared by dissolving 126 g of PTBP in 2.0 L of methylene chloride) and an aqueous solution of sodium hydroxide containing EPA (solution prepared by dissolving 1012 g of BPA in an aqueous solution prepared by dissolving 577 g of NaOH and 2.0 g of sodium dithionite in 8.4 L of water) were added to the polymer liquid, and then the mixture was subjected to a polymerization reaction for 50 minutes.

Then, 10 L of methylene chloride were added to the mixture to dilute the mixture, and then the diluted mixture was stirred for 10 minutes. After that, the resultant was separated into an organic phase containing polycarbonate and an aqueous phase containing excessive amounts of BPA and NaOH, and then the organic phase was isolated.

The solution of the polycarbonate in methylene chloride thus obtained was sequentially washed with a 0.03-mol/L aqueous solution of NaOH and 0.2-mol/L hydrochloric acid each having a volume corresponding to 15 vol % of the volume of the solution. Next, the resultant was repeatedly washed with pure water until an electric conductivity in an aqueous phase after the washing became 0.01 μS/m or less.

The solution of the polycarbonate in methylene chloride obtained by the washing was concentrated and pulverized, and then the resultant flake was dried under reduced pressure at 120° C.

The resultant flake had a PDMS residue content determined by NMR of 2.4 mass %, a viscosity number measured in conformity with ISO 1628-4 (1999) of 50.2, and a viscosity average molecular weight Mv of 18,900.

Next, 0.05 part by mass of tris(2,4-di-t-butylphenyl) phosphite available under the trade name "IRGAFOS 168" (manufactured by Ciba Specialty Chemicals Inc.) was blended into 100 parts by mass of the copolymer, and then the mixture was granulated with a uniaxial extruder of 40 mmφ with a vent at a resin temperature of 280° C. Thus, a pellet was obtained.

A sample for a sliding test was obtained by subjecting the resultant pellet to injection molding under the following molding conditions. The coefficient of dynamic friction, wear loss, and critical pressure of the resultant molded article were determined by performing the sliding test.

Example 2

The same operations as those of Example 1 were performed except that 205 g of a eugenol terminal-denatured PDMS having a repetition number of dimethylsiloxane units of 300 were used instead of 141 g of the allyl phenol terminal-denatured PDMS having a repetition number of dimethylsiloxane units of 300.

The resultant had a PDMS residue content of 3.5 mass %, a viscosity number of 50.4, and an Mv of 19,000.

Example 3

The same operations as those of Example 1 were performed except that the addition amount of the allyl phenol terminal-denatured PDMS having a repetition number of dimethylsiloxane units of 300 was changed from 141 g to 411 g.

The resultant had a PDMS residue content of 7.0 mass %, a viscosity number of 50.3, and an Mv of 18,900.

Example 4

The same operations as those of Example 1 were performed except that 413 g of an allyl phenol terminal-denatured PDMS having a repetition number of dimethylsiloxane units of 200 were used instead of 141 g of the allyl phenol terminal-denatured PDMS having a repetition number of dimethylsiloxane units of 300.

The resultant had a PDMS residue content of 7.0 mass %, a viscosity number of 50.4, and an Mv of 19,000.

Example 5

The same operations as those of Example 1 were performed except that 140 g of an allyl phenol terminal-denatured PDMS having a repetition number of dimethylsiloxane units of 650 were used instead of 141 g of the allyl phenol terminal-denatured PDMS having a repetition number of dimethylsiloxane units of 300.

The resultant had a PDMS residue content of 2.4 mass %, a viscosity number of 50.4, and an Mv of 19,000.

Example 6

The same operations as those of Example 1 were performed except that: 413 g of an allyl phenol terminal-denatured PDMS having a repetition number of dimethylsiloxane units of 200 were used instead of 141 g of the allyl phenol terminal-denatured PDMS having a repetition number of dimethylsiloxane units of 300; and the addition amount of PTBP was changed from 126 g to 87.0 g.

The resultant had a PDMS residue content of 7.0 mass %, a viscosity number of 64.2, and an Mv of 25,100.

Example 7

The same operations as those of Example 1 were performed except that: 413 g of an allyl phenol terminal-denatured PDMS having a repetition number of dimethylsiloxane units of 200 were used instead of 141 g of the allyl phenol terminal-denatured PDMS having a repetition number of dimethylsiloxane units of 300; and the addition amount of PTBP was changed from 126 g to 147 g.

The resultant had a PDMS residue content of 7.0 mass %, a viscosity number of 45.4, and an Mv of 16,800.

Example 8

The same operations as those of Example 1 were performed except that: 140 g of an allyl phenol terminal-denatured PDMS having a repetition number of dimethylsiloxane units of 650 were used instead of 141 g of the allyl phenol terminal-denatured PDMS having a repetition number of dimethylsiloxane units of 300; and the addition amount of PTBP was changed from 126 g to 87.0 g.

The resultant had a PDMS residue content of 2.4 mass %, a viscosity number of 64.0, and an Mv of 25,000.

Example 9

The same operations as those of Example 1 were performed except that: 140 g of an allyl phenol terminal-denatured PDMS having a repetition number of dimethylsiloxane units of 650 were used instead of 141 g of the allyl phenol terminal-denatured PDMS having a repetition number of dimethylsiloxane units of 300; and the addition amount of PTBP was changed from 126 g to 147 g.

The resultant had a PDMS residue content of 2.4 mass %, a viscosity number of 45.6, and an Mv of 16,900.

Example 10

The same operations as those of Example 1 were performed except that a pellet was obtained by: blending 35 parts by mass of the copolymer flake produced in Example 3, 65 parts by mass of a TARFLON FN1900A (trade name, manufactured by Idemitsu Kosan Co., Ltd., BPA polycarbonate having PTBP as a terminal group, viscosity number: 50.9, Mv=19,200), and 0.05 part by mass of tris(2,4-di-t-butylphenyl) phosphite available under the trade name "IRGAFOS 168" (manufactured by Ciba Specialty Chemicals Inc.); and granulating the mixture with a uniaxial extruder of 40 mmφ with a vent at a resin temperature of 280° C.

The resultant pellet had a PDMS residue content of 2.4 mass %, a viscosity number of 50.7, and a viscosity average molecular weight Mv of 19,100.

Example 11

A copolymer flake was produced in the same manner as in Example 1 by using 591 g of a eugenol terminal-denatured PDMS having a repetition number of dimethylsiloxane units of 200 instead of 141 g of the allyl phenol terminal-denatured PDMS having a repetition number of dimethylsiloxane units of 300.

The resultant flake had a PDMS residue content of 10.5 mass %, a viscosity number of 50.3, and an Mv of 18,900.

The same operations as those of Example 1 were performed except that a pellet was obtained by: blending 70 parts by mass of the resultant flake, 30 parts by mass of a TARFLON FN1900A (trade name, manufactured by Idemitsu Kosan Co., Ltd., BPA polycarbonate having PTBP as a terminal group, viscosity number: 50.9, Mv=19,200), and 0.05 part by mass of tris(2,4-di-t-butylphenyl)phosphite available under the trade name "IRGAFOS 168" (manufactured by Ciba Specialty Chemicals Inc.); and granulating the mixture with a uniaxial extruder of 40 mmφ with a vent at a resin temperature of 280° C.

The resultant pellet had a PDMS residue content of 7.0 mass %, a viscosity number of 50.5, and a viscosity average molecular weight Mv of 19,000.

Example 12

A copolymer flake was produced in the same manner as in Example 1 by using 1010 g of a eugenol terminal-denatured PDMS having a repetition number of dimethylsiloxane units of 150 instead of 141 g of the allyl phenol terminal-denatured PDMS having a repetition number of dimethylsiloxane units of 300.

The resultant flake had a PDMS residue content of 17 mass %, a viscosity number of 50.4, and an Mv of 19,000.

The same operations as those of Example 1 were performed except that a pellet was obtained by: blending 41 parts by mass of the resultant flake, 59 parts by mass of a TARFLON FN1900A (trade name, manufactured by Idemitsu Kosan Co., Ltd., BPA polycarbonate having PTBP as a terminal group, viscosity number: 50.9, Mv=19,200), and 0.05 part by mass of tris(2,4-di-t-butylphenyl)phosphite available under the trade name "IRGAFOS 168" (manufactured by Ciba Specialty Chemicals Inc.); and granulating the mixture with a uniaxial extruder of 40 mmφ with a vent at a resin temperature of 280° C.

The resultant pellet had a PDMS residue content of 7.0 mass %, a viscosity number of 50.7, and a viscosity average molecular weight Mv of 19,100.

Comparative Example 1

The same operations as those of Example 1 were performed except that a pellet was obtained by: blending 100 parts by mass of a TARFLON FN1900A (trade name, manufactured by Idemitsu Kosan Co., Ltd., BPA polycarbonate having PTBP as a terminal group, viscosity number: 50.9, Mv=19,200) and 0.05 part by mass of tris(2,4-di-t-butylphenyl)phosphite available under the trade name "IRGAFOS 168" (manufactured by Ciba Specialty Chemicals Inc.); and granulating the mixture with a uniaxial extruder of 40 mmφ with a vent at a resin temperature of 280° C.

Comparative Example 2

The same operations as those of Example 1 were performed except that the addition amount of the allyl phenol terminal-denatured PDMS having a repetition number of dimethylsiloxane units of 300 was changed from 141 g to 41 g.

The resultant had a PDMS residue content of 0.7 mass %, a viscosity number of 50.3, and an Mv of 18,900.

Comparative Example 3

The same operations as those of Example 1 were performed except that 210 g of an allyl phenol terminal-denatured PDMS having a repetition number of dimethylsiloxane units of 100 were used instead of 141 g of the allyl phenol terminal-denatured PDMS having a repetition number of dimethylsiloxane units of 300.

The resultant had a PDMS residue content of 3.5 mass %, a viscosity number of 50.4, and an Mv of 19,000.

Comparative Example 4

The same operations as those of Example 1 were performed except that 316 g of an allyl phenol terminal-denatured PDMS having a repetition number of dimethylsiloxane units of 40 were used instead of 141 g of the allyl phenol terminal-denatured PDMS having a repetition number of dimethylsiloxane units of 300.

The resultant had a PDMS residue content of 3.5 mass %, a viscosity number of 50.4, and an Mv of 19,000.

Comparative Example 5

The same operations as those of Example 1 were performed except that 1266 g of an allyl phenol terminal-denatured PDMS having a repetition number of dimethylsiloxane units of 40 were used instead of 141 g of the allyl phenol terminal-denatured PDMS having a repetition number of dimethylsiloxane units of 300.

The resultant had a PDMS residue content of 20 mass %, a viscosity number of 50.5, and an Mv of 19,000.

Comparative Example 6

The same operations as those of Example 1 were performed except that 1022 g of an allyl phenol terminal-denatured PDMS having a repetition number of dimethylsiloxane units of 100 were used instead of 141 g of the allyl phenol terminal-denatured PDMS having a repetition number of dimethylsiloxane units of 300.

The resultant had a PDMS residue content of 17 mass %, a viscosity number of 50.6, and an Mv of 19,100.

Examples 1 to 12 and Comparative Examples 1 to 6

The measurements of a coefficient of dynamic friction and a wear loss, and the measurement of a critical PV value each serving as sliding property evaluation were performed by using each of the polycarbonate-based resin compositions for sliding use obtained in Examples 1 to 12 and Comparative Examples 1 to 6. Tables 1-1, 1-2, and 1-3 show the results of the measurements.

TABLE 1-1

|  | Example 1 | Example 2 | Example 3 | Example 4 | Example 5 | Example 6 |
| --- | --- | --- | --- | --- | --- | --- |
| PDMS chain length [n] | 300 | 300 | 300 | 200 | 650 | 200 |
| PDMS copolymerization amount [mass %] | 2.4 | 3.5 | 7.0 | 7.0 | 2.4 | 7.0 |
| Coefficient of dynamic friction | 0.15 | 0.15 | 0.15 | 0.15 | 0.15 | 0.15 |
| Wear loss [mm$^3$] | 3 | 2 | 2 | 2 | 1 | 2 |
| Critical PV value [KPa · m/s] | >75 | >75 | >75 | >75 | >75 | >75 |

TABLE 1-2

|  | Example 7 | Example 8 | Example 9 | Example 10 | Example 11 | Example 12 |
|---|---|---|---|---|---|---|
| PDMS chain length [n] | 200 | 650 | 650 | 300 | 200 | 150 |
| PDMS copolymerization amount [mass %] | 7.0 | 2.4 | 2.4 | 2.4 | 7.0 | 7.0 |
| Coefficient of dynamic friction | 0.15 | 0.15 | 0.15 | 0.15 | 0.15 | 0.15 |
| Wear loss [mm$^3$] | 2 | 2 | 2 | 2 | 2 | 2 |
| Critical PV value [KPa · m/s] | >75 | >75 | >75 | >75 | >75 | >75 |

TABLE 1-3

|  | Comparative Example 1 | Comparative Example 2 | Comparative Example 3 | Comparative Example 4 | Comparative Example 5 | Comparative Example 6 |
|---|---|---|---|---|---|---|
| PDMS chain length [n] | None | 300 | 100 | 40 | 40 | 100 |
| PDMS copolymerization amount [mass %] | None | 0.7 | 5 | 5 | 20 | 17 |
| Coefficient of dynamic friction | Melting | 0.55 | Melting | 0.35 | 0.15 | 0.15 |
| Wear loss [mm$^3$] | Melting | 29 | Melting | 39 | 10 | 9 |
| Critical PV value [KPa · m/s] | 30 | 38 | 45 | 38 | 30 | 38 |

* Melting: In the case of a sliding test where SUS304 was used as a counterpart material, the melting of a resin and deformation due to the melting occurred during the test in each of Comparative Examples 1 and 3

INDUSTRIAL APPLICABILITY

According to the present invention, there can be provided a polycarbonate-based resin composition for sliding use, which is excellent in sliding property and has improved wear resistance, and a molded article using the composition and having the above-mentioned properties.

The invention claimed is:

1. A molded article obtained by injection molding a polycarbonate-based resin composition comprising:

0.01 to 1 part by mass of an antioxidant with respect to 100 parts by mass of a polycarbonate-polyorganosiloxane copolymer which has at least one structural unit represented by formula (A)

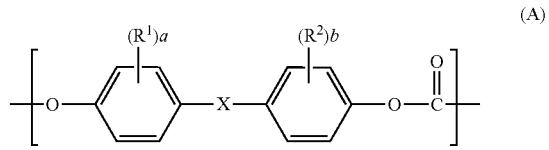

and at least one structural unit represented by formula (B)

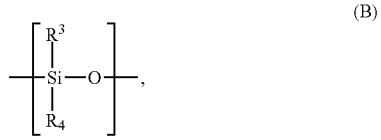

wherein
the polycarbonate-polyorganosiloxane copolymer comprises a polyorganosiloxane block moiety comprising the structural unit of the formula (B) at a content of 1 to 30 mass %,
the polycarbonate-polyorganosiloxane copolymer has an average repetition number of the structural unit of the formula (B) of 110 to 1000,
$R^1$ and $R^2$ each independently represent an alkyl or alkoxy group having 1 to 6 carbon atoms,
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—,
$R^3$ and $R^4$ each independently represent a hydrogen atom, a halogen atom, or an alkyl or aryl group which may have a substituent,
a and b each represent an integer of 0 to 4, and
the molded article has a wear loss of 3 mm$^3$ or less, determined in conformity with JIS K7218 A method (Ring on Ring).

2. The molded article according to claim 1, wherein the polycarbonate-polyorganosiloxane copolymer has a viscosity average molecular weight of 13,000 to 50,000.

3. The molded article according to claim 1, further comprising 2 to 98 parts by mass of an aromatic polycarbonate with respect to 100 parts by mass of the polycarbonate-polyorganosiloxane copolymer.

4. The molded article according to claim 2, further comprising 2 to 98 parts by mass of an aromatic polycarbonate with respect to 100 parts by mass of the polycarbonate-polyorganosiloxane copolymer.

5. The molded article according to claim 1, wherein the polycarbonate-polyorganosiloxane copolymer has a viscosity average molecular weight of 15,000 to 30,000.

6. The molded article according to claim 1, wherein the polycarbonate-polyorganosiloxane copolymer has a viscosity average molecular weight of 15,000 to 26,000.

7. The molded article according to claim 1, comprising 0.01 to 0.5 parts by mass of the antioxidant with respect to 100 parts by mass of a polycarbonate-polyorganosiloxane copolymer.

8. The molded article according to claim 1, wherein the molded article has a critical PV value of greater than 75 KPa·m/s, determined in conformity with JIS K7218 A method (Ring on Ring).

* * * * *